(No Model.)  
4 Sheets—Sheet 1.

B. LOOMIS.
APPARATUS FOR MANUFACTURING GAS.

No. 338,991. Patented Mar. 30, 1886.

Witnesses:  
H. W. T. Jenner.  
E. E. Loomis.

Inventor.  
Burton Loomis.

(No Model.) 4 Sheets—Sheet 2.

B. LOOMIS.
APPARATUS FOR MANUFACTURING GAS.

No. 338,991. Patented Mar. 30, 1886.

(No Model.) 4 Sheets—Sheet 4.

B. LOOMIS.
APPARATUS FOR MANUFACTURING GAS.

No. 338,991. Patented Mar. 30, 1886.

Witnesses:
Inventor.

UNITED STATES PATENT OFFICE.

BURDETT LOOMIS, OF HARTFORD, CONNECTICUT.

APPARATUS FOR MANUFACTURING GAS.

SPECIFICATION forming part of Letters Patent No. 338,991, dated March 30, 1886.

Application filed May 12, 1885. Serial No. 165,249. (No model.)

*To all whom it may concern:*

Be it known that I, BURDETT LOOMIS, a citizen of the United States, residing at Hartford, in the county of Hartford and State of Connecticut, have invented certain new and useful Improvements in Apparatus for Manufacturing Gas, of which the following is a specification, reference being had therein to the accompanying drawings.

This invention relates to apparatus for generating illuminating and heating gas, and embraces improvements in the cupola gas-generating furnace and the superheating and fixing chambers connected therewith, whereby the apparatus is made more compact in construction, and more efficient and economical in operation.

The object of the invention is to provide means for more thoroughly superheating steam and then decomposing it in contact with incandescent fuel, and for carbureting and fixing the resulting gas in a continuous operation; also to provide improved means for heating up both the steam-superheater and the fixing-chambers simultaneously at the time the air-blasts are admitted to the fuel; also to provide means for readily sealing and unsealing the gas-eduction pipes in the hydraulic seal-box, whereby the pressure in either fixing-chamber may be quickly relieved, so that gas may be made at a lower pressure, and the danger of producing lamp-black by carbonization of the oil thus prevented, and improved results thus secured.

The improvements will be particularly described by reference to the accompanying drawings, and the parts or combinations thereof which constitute my invention will be defined in the claims.

Figure 1:
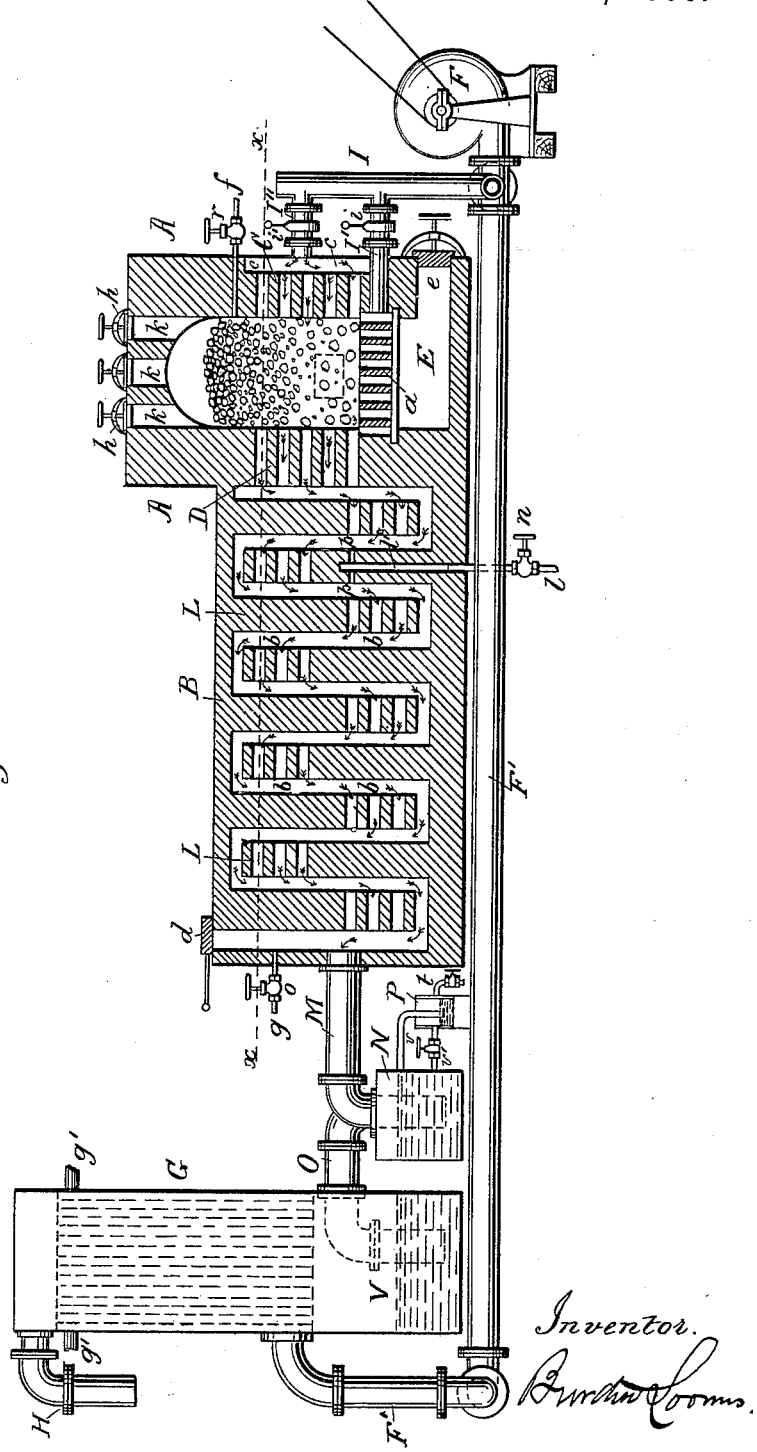
Figure 2:
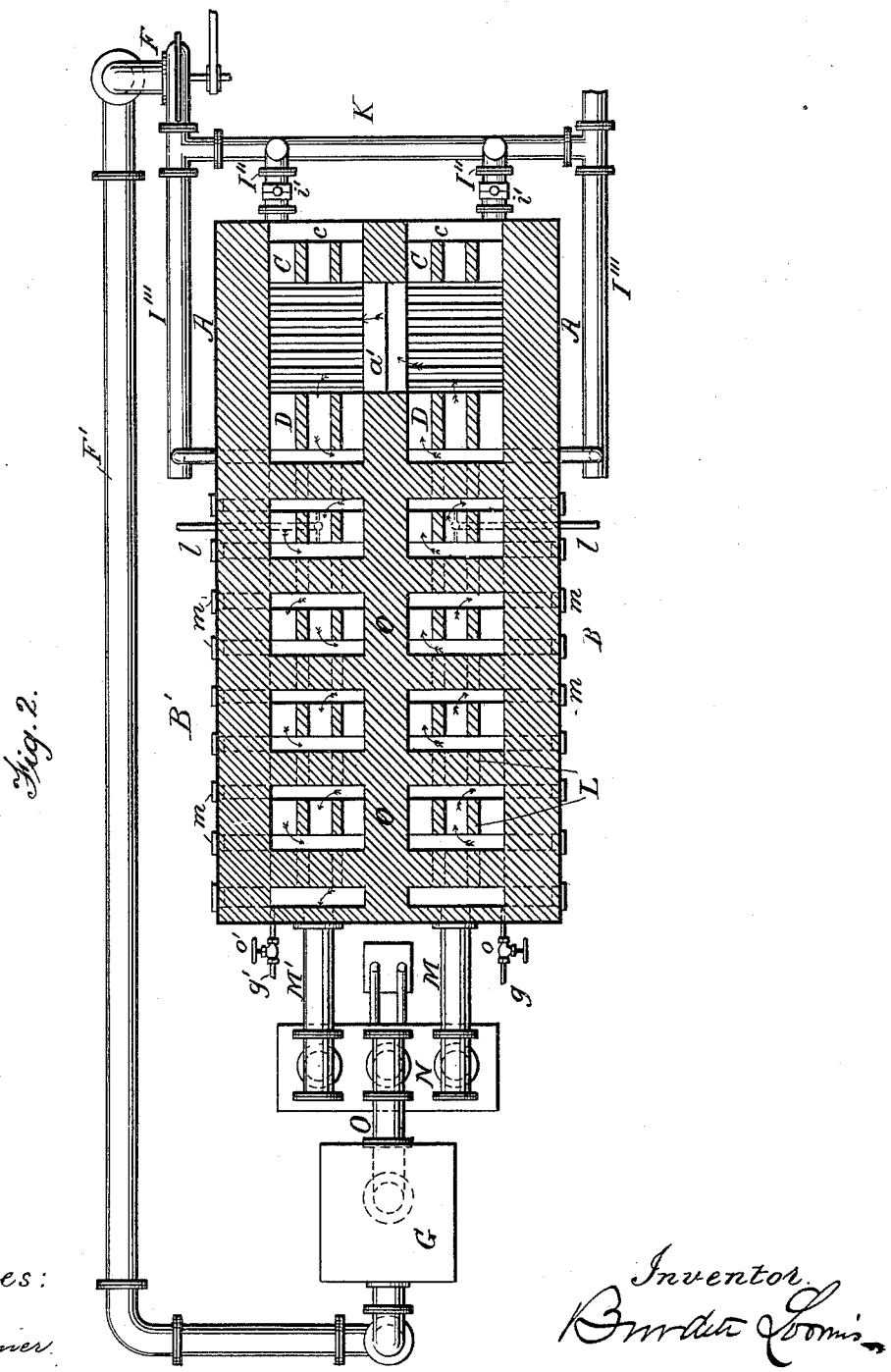
Figure 3:
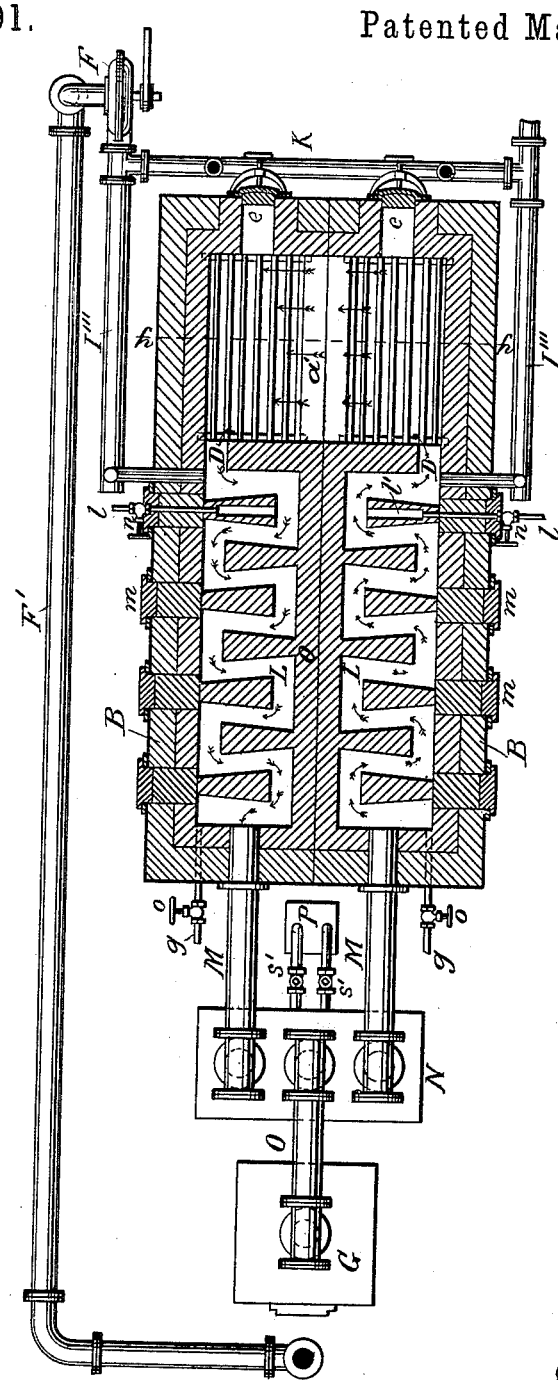
Figure 4:
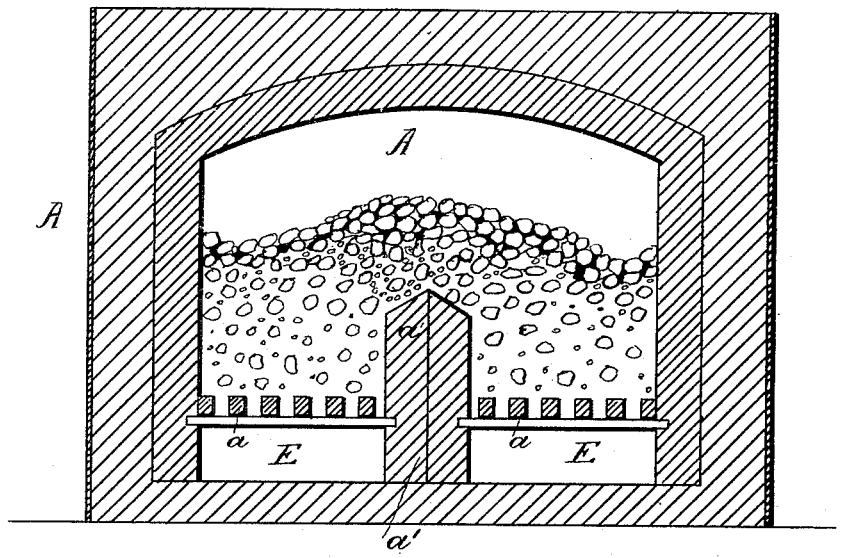
Figure 5:
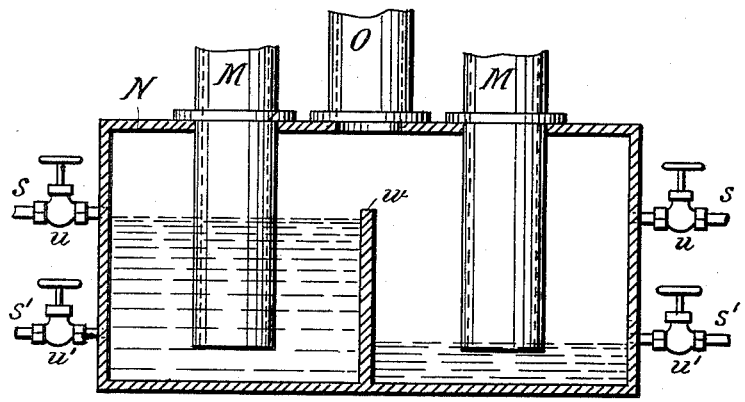

In the accompanying drawings, Figure 1 represents a longitudinal vertical section of the apparatus. Fig. 2 represents a horizontal section on the line $x$ $x$, Fig. 1. Fig. 3 represents a horizontal section showing a modified form of superheating and fixing chambers. Fig. 4 represents a vertical cross-section of the fuel and decomposing chamber on line $y$ $y$ in Fig. 3. Fig. 5 represents a vertical cross-section through the hydraulic seal-box.

The generating-chamber A and the superheating and fixing chambers B B' are built of brick in one structure, and they may all be covered by a tight jacket of riveted boiler-iron. The chambers B B' both connect directly with the fuel-chamber, and are both heated up at the same time by hot gaseous products from such fuel-chamber, and may be used alternately—one as the steam-superheater and the other as the gas carbureting and fixing chamber.

The generating-chamber A is divided in its lower part by a brick partition, $a'$, rising about a third of the height of such chamber and forming two ash-pits, E, each of which has a grate, $a$. The ash-pits have openings $e$, for removal of ashes, closed by tight-fitting doors. Openings or passages $k$, having tight-fitting lids, are provided in the top of chamber A, for supplying fuel and for the insertion of clinker-bars to clean the walls, if necessary. Air-chambers $c$ $c$ are formed in the front wall, and are separated from the fuel-chamber by cellular wall C, formed of fire-brick and having numerous passages for the air up about half the height of the wall. Air-blast pipes I", having valves $i'$, connect with chambers $c$, and blast-pipes I', having valves $i$, connect with the grates, which are preferably composed of hollow perforated grate-bars. Pipe K connects with the blower F and supplies air to the vertical pipes I, with which pipes I' I" connect. Pipes I''' extend from pipe K and connect with chambers B B', just in front of the gratings D, to supply air to burn the gaseous products from the generator to heat the superheating and fixing chambers. Air to supply the blower is passed through the gas-cooler and air-heater G, and flows therefrom through pipe F' to the blower.

Chambers B and B' are separated by a central vertical wall, O, which may be a continuation of partition $a$, and each chamber is provided with a series of vertical transverse check-walls, L, extending alternately from the top and bottom of the chamber, as shown, so as to form a tortuous passage up and down through the chamber. Each check-wall is perforated near its outer end, as at $b$, so as to divide up the passing current of gaseous products and provide a more extended heating-surface. One or more of the check-walls near the fuel-chamber in each chamber B B' is made hollow or formed with a passage, $l'$, connecting, by perforations $p$, with the tortuous channel, and having at the outer end an oil-supply pipe, $l$, provided with valve $n$, thus forming an oil-vaporizer.

The side walls of the chambers B B' are provided with cleaning-openings connecting with the lower part of the channel between the check-walls, and such openings are closed by stoppers $m$. The tortuous channels at the outer ends extend up through the roof of the chambers for the escape of products of combustion, and are there provided with controlling-dampers $d$. Steam-pipe $g$, having valve $o$, connects with the rear end of chamber B, and a similar pipe, $g'$, having valve $o'$, connects with the rear end of chamber B'. Gas-escape pipes M M' lead from the chambers into hydraulic seal-box N, into which they dip nearly to its bottom, and pipe O leads from box N into the chamber V at the base of the gas-cooler G. Seal-box N is provided with a transverse partition, $w$, separating the two inlet-pipes and forming two chambers, $n'$ $n''$, each of which has a water-supply pipe, $s$, having valve $u$, and a discharge-pipe, $s'$, having valve $u'$, whereby either chamber may be flushed or emptied, or nearly so, as desired. Overflow-pipe $v$ and discharge-pipe $v'$ connect box N with tar-trap P, having outlet-pipe $t$.

The gas-cooler and air-heater G is provided with tubes for the passage of gas, and has connecting with the chamber through which the tubes pass the air-inlet tubes $g'$ $g'$, and the outlet-pipe F', connecting with the blower. The gas-inlet pipe O connects with chamber V of cooler G, and the gas-discharge pipe H leads from the upper chamber to the purifier or scrubber, from which the gas flows to the holder in the usual manner. A steam-supply pipe, $f$, having valve $r$, connects with the upper part of the fuel-chamber. The check-walls in Fig. 3 are arranged to extend transversely and alternately from the side walls and partition-wall, so as to form tortuous channels passing back and forth from side to side through the chambers.

In Fig. 3 the gratings are replaced by simple passages D just above or below the grates.

The apparatus may be conveniently operated to produce either illuminating or heating gas.

For manufacturing illuminating-gas the operation is as follows: A fire is kindled on both grates of the generator, the doors $e$ and one or more of the lids $h$ being open for a natural draft, and fuel is gradually fed in till a deep body thereof is heated to incandescence. After the fire is well kindled, however, the doors $e$ and lids $h$ may be closed, dampers $d$ opened, and the air-blast admitted from the blower through pipes I' or I'', or both, into the fuel-chamber, and through pipes I''' to chambers B B', for burning, the gaseous products containing a large per cent. of carbonic oxide passing off from the fuel-chamber, and the blasts are continued till a sufficient depth of fuel is raised to incandescence and chambers B B' are heated to the desired temperature, then they are shut off, suitable valves (not shown) being used in pipes I''' or their short lateral connections with the chambers, and dampers $d$ are closed. Steam is now admitted into one of the chambers, as B', through pipe $g'$ by opening valve $o'$, and is highly superheated by passage through the tortuous channel around the check-walls and is decomposed by passage through the fuel. The resulting water-gas passes through grating D into chamber B, where it is carbureted by the admission of hydrocarbon oil into the passage or chamber $l'$ in one of the check-walls, the oil being vaporized and the vapor flowing out through perforations $p$ into the water-gas. The carbureted gas is fixed in its passage through the tortuous channel in contact with the heated refractory check-walls, and flows through pipe M into the exhausted or nearly empty chamber $n'$ of the seal-box. At the time steam is admitted into chamber B' and gas discharged from chamber B into chamber $n'$ of the seal-box, as above described, pipe M' is sealed by the admission of water into chamber $n''$ of the seal-box through pipe $s$, and water is drawn off from chamber $n'$ by opening valve $u'$ in pipe $s'$ of such chamber, so that steam is prevented from flowing through pipe M' into the seal-box, and so that the pressure usually caused by a fluid seal is removed from the generator and fixing-chamber, and the danger of forming carbon and lamp-black deposits in the fixing-chamber thereby prevented. The gas passes from the seal-box through pipe O and up through the tube of the gas-cooler G, and thence by pipe H to the purifiers, on its way to the holder. After the apparatus has been reheated the direction of the steam and gas through chambers B B' may be reversed, at which time chamber $n'$ of the seal-box is flushed and chamber $n''$ exhausted of water down to outlet-pipe $s'$.

When using the apparatus to make water-gas for heating purposes only, air for supporting combustion of the fuel may be passed through one of the chambers B B', through which the hot water-gas was last passed for taking up the heat, while the other chamber is being highly heated for subsequently superheating steam.

Having described my invention, what I claim, and desire to secure by Letters Patent, is—

1. The combination of a fuel and steam decomposing chamber with two superheating-chambers, both of which connect directly by passages through the same division-wall with the fuel-chamber, as described, whereby both may be heated up at the same time.

2. The fuel-chamber having a grating in its front wall and a grating in the opposite side wall, in combination with two superheating-chambers connected directly with the fuel-chamber through the perforated side wall.

3. The fuel-chamber having a cellular or perforated front wall, an air-chamber outside thereof, and a connecting air-blast pipe and a perforated rear wall, in combination with the two superheating-chambers, both connecting with the fuel-chamber through the perforated rear wall.

4. The combination of a fuel and decomposing chamber with a superheating-chamber constructed with vertical check-walls extending alternately from the top and bottom of the chamber to near the opposite side, forming a tortuous passage extending up and down through the chamber.

5. The superheating-chamber of a gas-generator, having a filling of perforated vertical check-walls extending alternately from opposite sides of the chamber, so as to form a tortuous channel, for the purpose described.

6. In combination with a gas-generator having two gas-outlet pipes, the connected seal-box down into which the gas-pipes project, said box having two chambers and water supply and discharge pipes arranged to flush or draw off water from either box for sealing or unsealing either connecting gas-pipe at will, for the purpose described.

7. The combination of a generating-chamber, two superheating-chambers connecting therewith, a seal-box having two chambers, two gas-pipes connecting the superheating-chambers with the chambers of the seal-box, and water supply and discharge pipes arranged to flush or draw off water from either box for sealing or unsealing either connecting gas-pipe at will, for the purpose described.

In testimony whereof I affix my signature in presence of two witnesses.

BURDETT LOOMIS.

Witnesses:
F. M. DOUGHERTY,
J. J. GREBLE.